Figure 1:
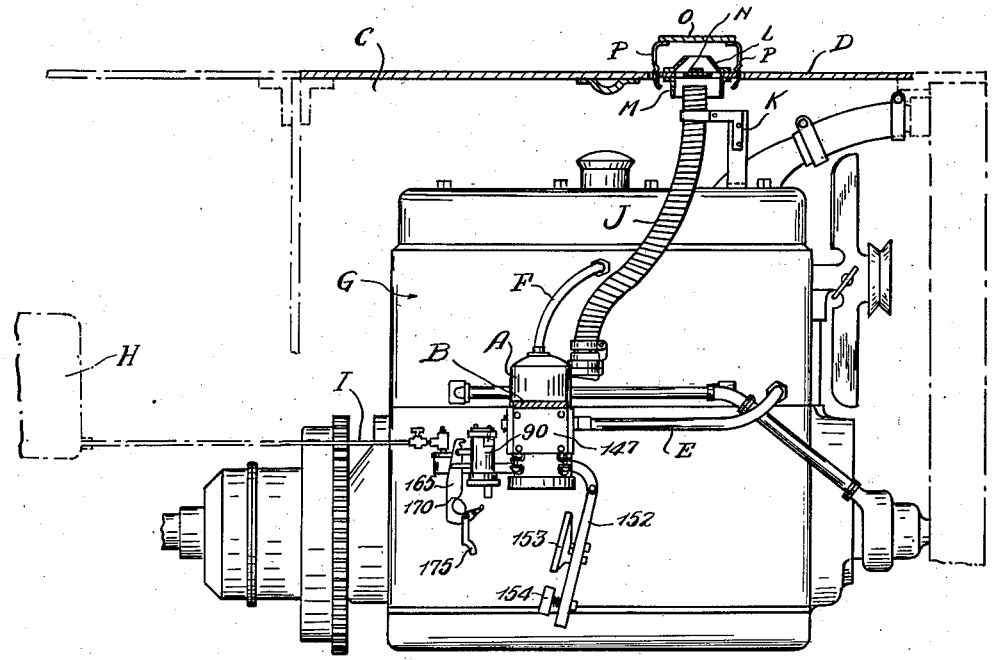

Jan. 22, 1946.  M. RESEK  2,393,411
HEATING APPARATUS
Filed March 13, 1943  4 Sheets-Sheet 1

INVENTOR.
MARC RESEK
BY
ATTORNEYS

Jan. 22, 1946.  M. RESEK  2,393,411
HEATING APPARATUS
Filed March 13, 1943  4 Sheets-Sheet 2

INVENTOR.
MARC RESEK
BY
ATTORNEYS

Jan. 22, 1946. M. RESEK 2,393,411
HEATING APPARATUS
Filed March 13, 1943 4 Sheets-Sheet 3
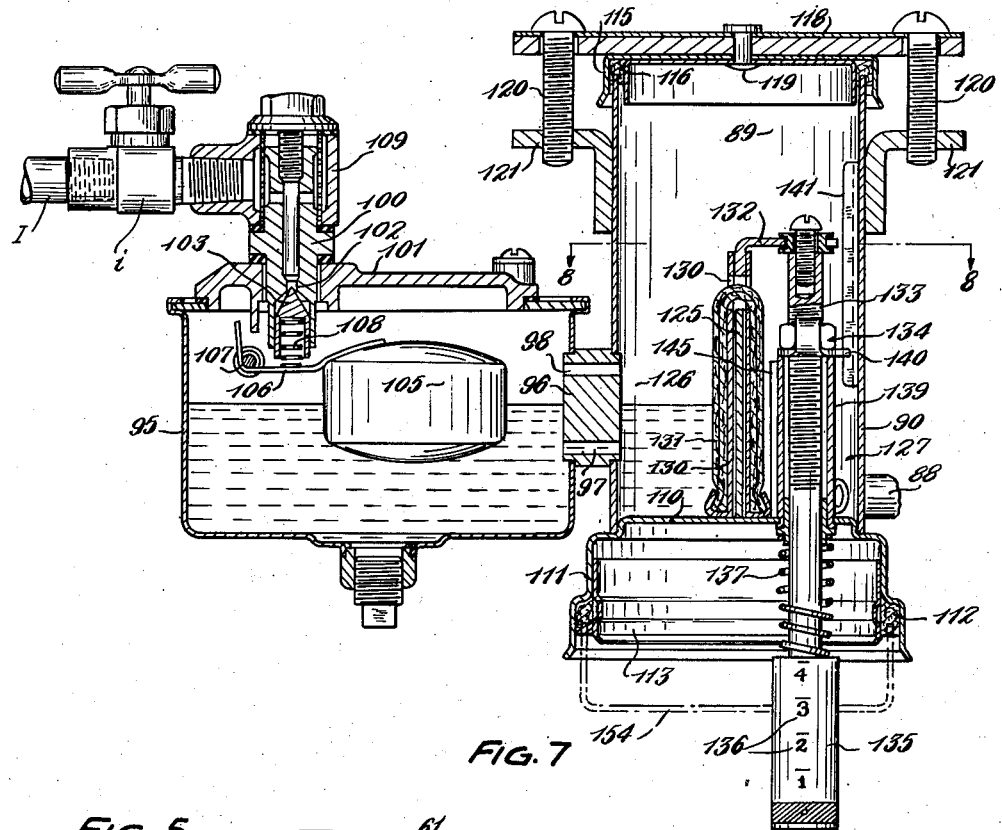
FIG. 7
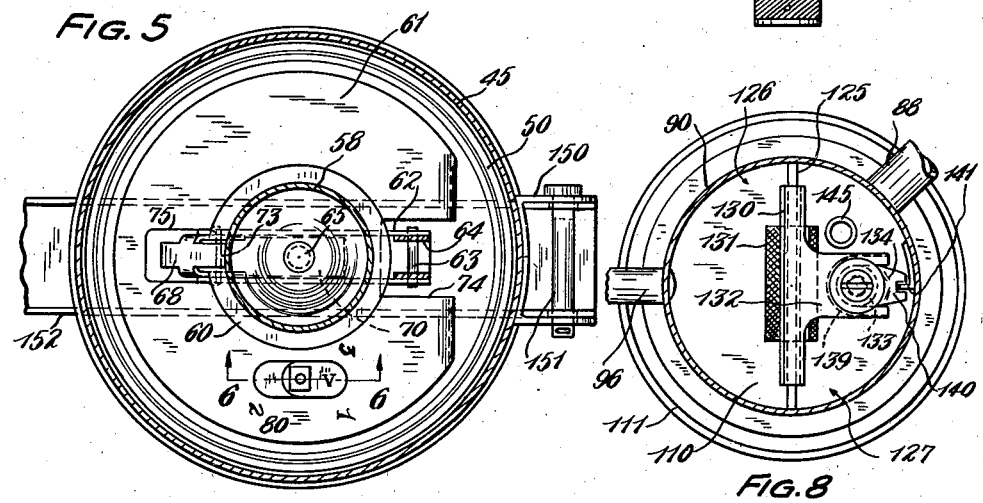
FIG. 5
FIG. 8
FIG. 6
INVENTOR.
MARC RESEK
BY
ATTORNEYS Jan. 22, 1946.  M. RESEK  2,393,411
HEATING APPARATUS
Filed March 13, 1943  4 Sheets-Sheet 4

INVENTOR.
MARC RESEK
BY
ATTORNEYS

Patented Jan. 22, 1946

2,393,411

UNITED STATES PATENT OFFICE 2,393,411

HEATING APPARATUS

Marc Resek, Cleveland Heights, Ohio, assignor to Perfection Stove Company, Cleveland, Ohio, a corporation of Ohio Application March 13, 1943, Serial No. 479,038

14 Claims. (Cl. 126—93)

This invention relates, generally, to improvements in heating apparatus, and more particularly to apparatus of this kind devised as a heater for internal combustion engines of automotive vehicles for heating them in cold weather for the purpose of facilitating ready explosion and consequent easy starting.

Motorized military equipment, such as tanks, trucks and other conveyances propelled by internal combustion engines, are sometimes subjected to extremely low temperatures and severe weather conditions and are required to travel over very rough terrain and through water in the fording of streams or the like to a depth that submerges much of the engine.

The principal objects of the invention are to provide a heating apparatus for the above mentioned purpose that is fired by liquid fuel, desirably obtained from the same source or tank as that from which the engine is supplied, and that is especially adapted for use with engines of mechanized military equipment in that it is very rugged, and the casing of which is water-tight to the required height and is equipped with closure means for effectively sealing the apparatus throughout its lower portion against the ingress of water at times when the vehicle is not in use; that incorporates means for preventing delivery of fuel to the burner when said closure means is in effective position; that is equipped with an adjustable air control by which the rate of combustion and consequent heat output may be varied to meet the requirements of different size engines; that is so designed and constructed that its several units may be adjusted with respect to one another, or may be assembled in different relations to one another, thereby to adapt the apparatus to various positions on different sizes and types of vehicles and to render it practically universal of application; that is quite simple and convenient of installation, is noiseless in operation, emits no light outside of the vehicle, and may be easily and quickly gotten ready for use and lighted, desirably from below.

Another object of the invention is to provide a heating apparatus of the aforesaid character that is highly efficient and of a capacity to heat, to the required degree, the engines of the largest vehicles of the class on which the apparatus is intended for use, and, on the other hand, that is of relatively small compass and is very compact so that it may be accommodated by such restricted space as that along side the engines and beneath the hoods of the smallest vehicles of said class.

A further object of the invention is to provide heating apparatus for internal combustion engines incorporating a pot-type burner wherein gasoline containing tetraethyl lead, commonly called ethyl gasoline, may be successfully and efficiently burned, wherefore the apparatus may be supplied with fuel from the same source as the engine, it being generally known that the customary type of gasoline burner is not suited to the burning of leaded gasoline because the orifices of the burner become clogged.

Figure 2:
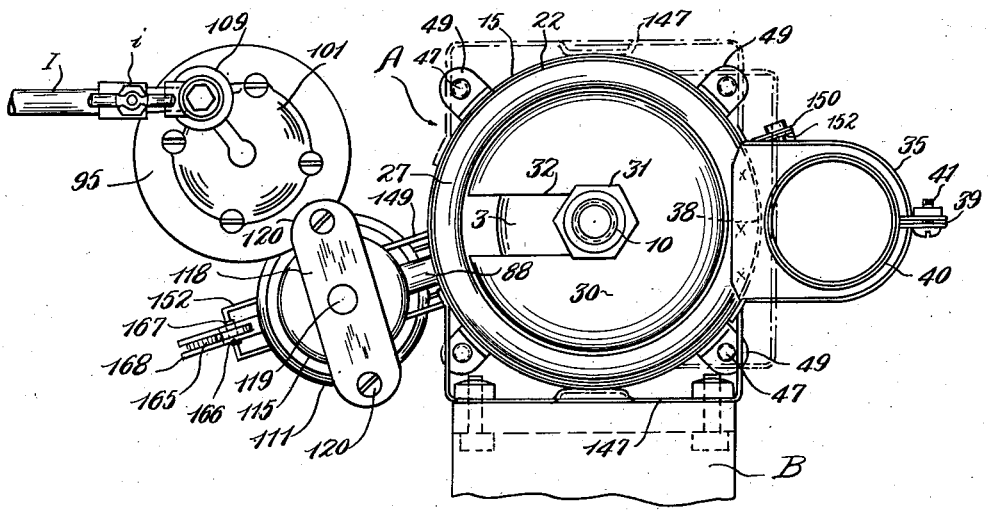
Figures 3, 4:
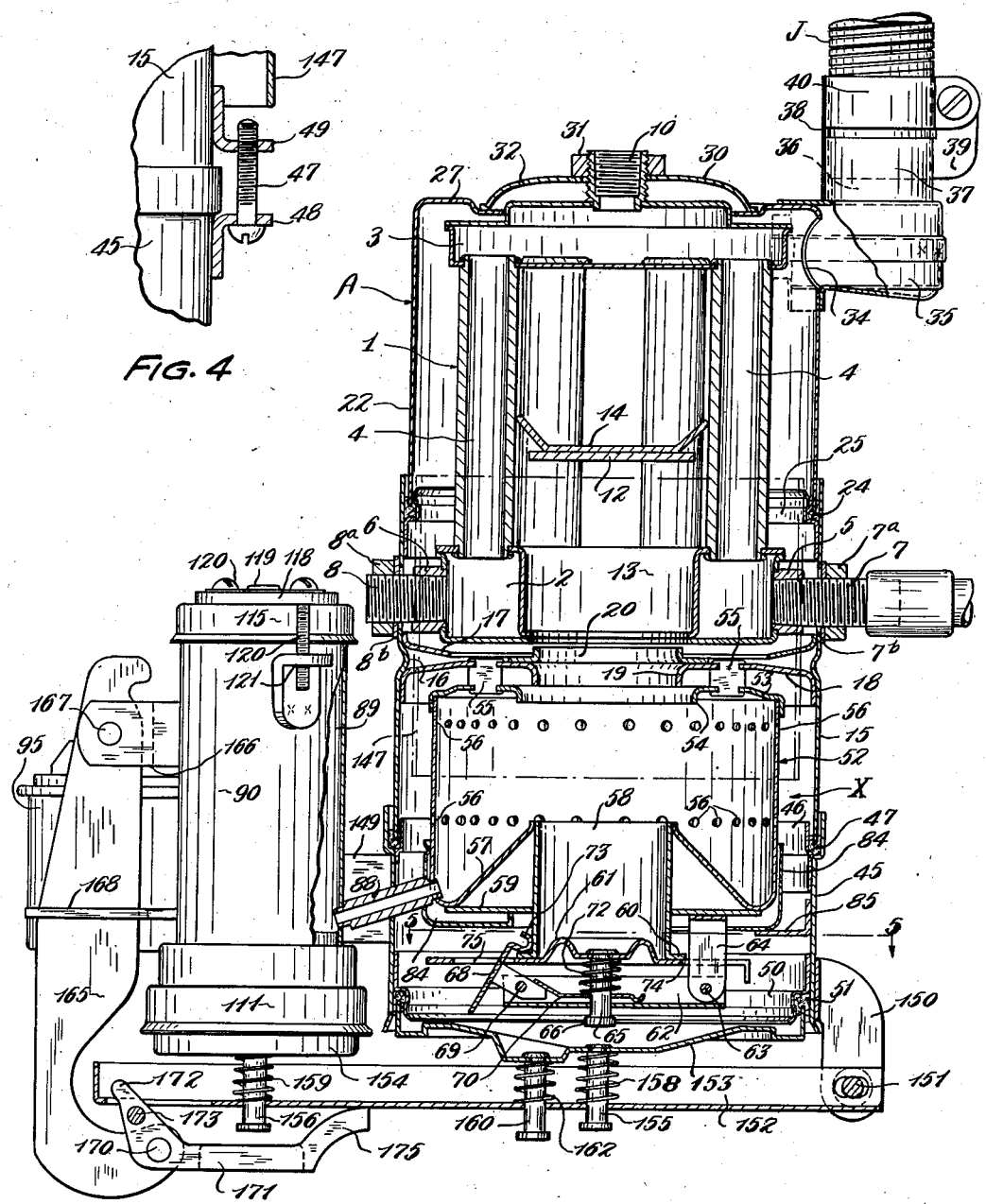
Figure 9:
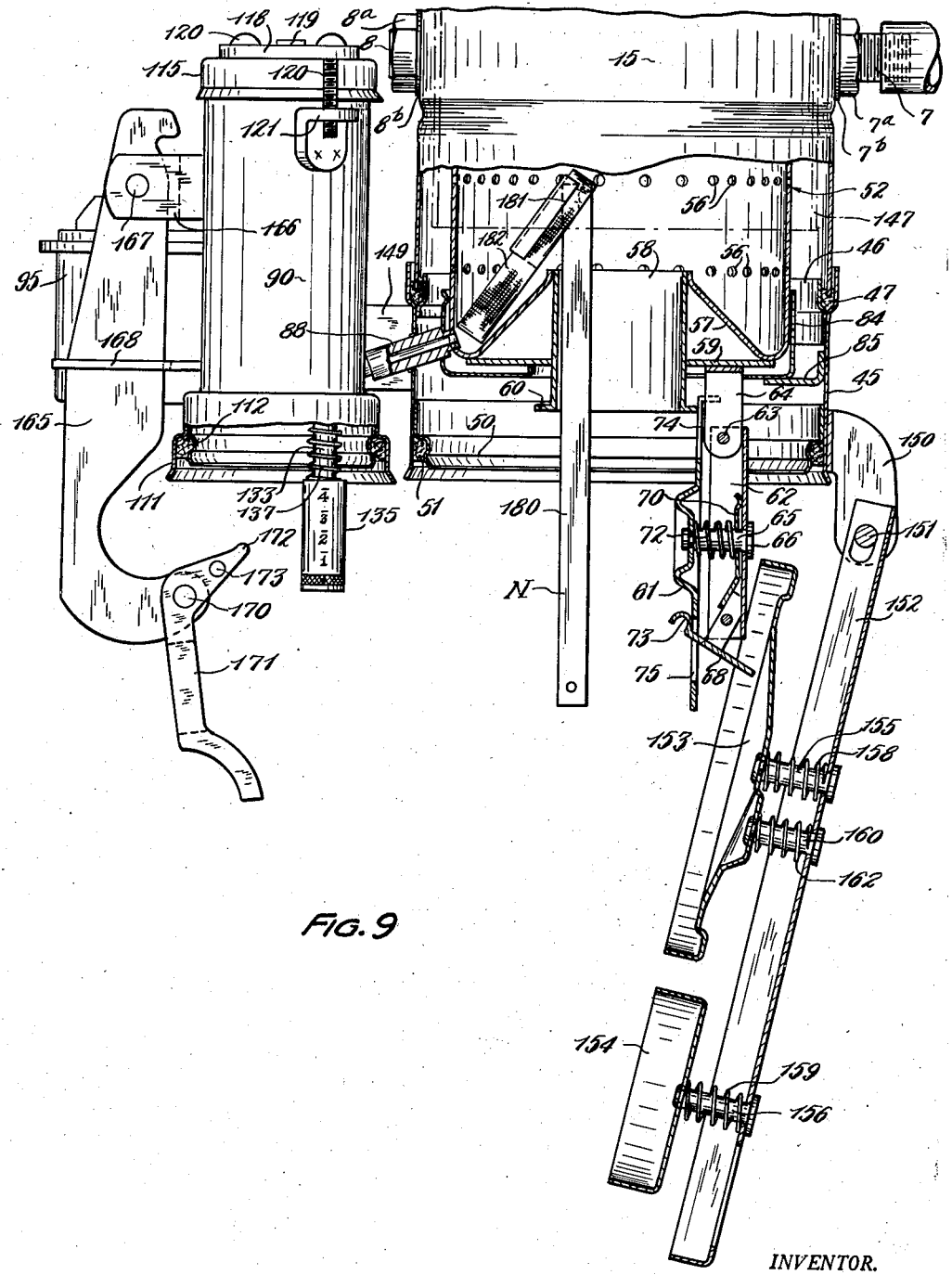

The foregoing objects, with others hereinafter appearing, are attained in the embodiment of the invention illustrated in the accompanying drawings wherein Fig. 1 is a view, somewhat in the nature of a diagram, showing my improved heating apparatus installed in the engine compartment of a vehicle and connected in circuit with the cooling system of the engine, the closure means for the bottom of the apparatus being open, as when the apparatus is in operation; Fig. 2 is a plan view of the apparatus, the bracket by which it is supported being broken away; Fig. 3 is a vertical section through the apparatus on a scale considerably enlarged over that of Fig. 2, the plane of section being coincident with the vertical axes of the heater and fuel feed chamber, and the flue connection being shown as swung to such plane from the position it occupies in Fig. 2; Fig. 4 is a detail of one of the lug and screw connections between the combustion chamber body and the bottom extension thereof; Fig. 5 is a horizontal section through the lower part of the heater, on the line 5—5 of Fig. 3; Fig. 6 is a sectional detail on the line 6—6 of Fig. 5; Fig. 7 is a vertical section through the float chamber and fuel feed casing; Fig. 8 is a horizontal section on the line 8—8 of Fig. 7, and Fig. 9 is a side elevational view, partly in section, of the lower portion of the heater, showing the bottom closure means in open position, the lighting tube closure dropped, and the igniter in position for lighting the burner.

With reference particularly to Fig. 1: The apparatus, designated generally by the reference letter A, is adapted to be supported by a bracket B from a convenient part of the vehicle within the engine compartment C beneath the hood D. The circulating unit of the apparatus A is connected through conduits E and F with the water jacket of the cylinder block of the engine that is designated generally by the reference letter G, the conduit E connecting the inlet of the circulating unit with the lower portion of the water jacket, while the conduit F, leading from the outlet of said unit, may connect with any convenient part of the water jacket at a point remote from the connection therewith of the conduit E. It is preferable, although not essential to thermosiphon action that is depended upon for circulation, that the conduit F be connected with the top portion of the water jacket. Obviously, the communicative connections between the circulating unit of the apparatus and the cooling system of the engine may be otherwise than that above described, as by connecting the conduits E and F with parts of the cooling system apart from, instead of directly with, the water jacket of the cylinder block, although the circuit desirably excludes the radiator of the vehicle.

Liquid fuel is conducted to the apparatus from any suitable source, such as the main fuel tank H of the vehicle, through a pipe I. The products of combustion are carried away through a flue J. This flue discharges to the atmosphere, and preferably consists of flexible tubing of standard construction. By reason of this the installation may be varied according to the requirements of different types and kinds of vehicles. In the arrangement illustrated in Fig. 1, the outlet end of the flue is situated in discharging relation to a relatively large hole in the hood D and is supported independently of the hood from an adjacent part of the vehicle structure. In the present instance the flue is supported, through a bracket K, from the engine G. Mounted on the hood, in register with the aforesaid hole, is a frusto conical flue cap L, and depending from the hood about said hole and in radially spaced relation to the end of the flue is a skirt M. A deflector N is supported in axially spaced relation to the end of the flue, as centrally within the hole of the hood, to shield the flue from any downdraft, while a plate O is adapted to be sustained in spaced relation to the open top of the cap L by legs P. These legs are of resilient material and project through openings in the hood and are formed to coact with the hood in such manner as to frictionally hold the plate O in the position just mentioned. However, when the apparatus is shut down, as when the engine is in use, the plate O may be pushed down against the cap to close it, the legs P yielding to such action.

Turning now to a more detailed description of the engine heating apparatus with particular reference to Fig. 3, the circulating unit, designated generally by the numeral 1, consists of a lower annular header 2 and an upper circular header 3 that are connected together and spaced apart by vertical tubes 4 through which they communicate. Hollow bosses 5 and 6 extend from diametrically opposite parts of the lower header 2, and into one is threaded an end of a nipple 7, that constitutes the inlet of the circulating unit, and into the other, a solid threaded plug 8. An internally and externally threaded tubular fitting 10 has its lower end secured, as by welding, within a central opening of the top wall of the upper header 3 and constitutes the outlet of the circulating unit. A baffle 12, in the form of a disk, is shown as supported a suitable distance above the central opening 13 of the lower header 2 by means of a member 14 to which the baffle is suitably connected, as by welding, the upwardly inclined ends of the member 14 being similarly attached to diametrically opposed ones of the tubes 4.

Surrounding the lower portion of the circulating unit 1 and extending a material distance below the bottom plane thereof is a combustion chamber body 15, the same being cylindrical and shown as surrounded at about its vertical center by an internal bead 16, preferably formed by depressing the wall of the chamber inwardly. Fitted within the combustion chamber body immediately above the bead 16 is a ring 17 that projects inwardly and slightly downwardly from the cylindrical wall of the body, and secured to said wall of the body immediately below the bead is the peripheral flange of an annulus 18. The inner edge of the annulus is flanged downwardly to provide a lip 19, and mounted on the annulus, in concentric relation to its central opening, is a ring-like member 20 having a shallow cylindrical upstanding flange whose diameter is approximately the same as that of the lip 19 and somewhat less than the diameter of the central opening 13 of the lower header 2 of the circulating unit. The member 20 includes a flat base flange through which it is welded or otherwise attached to the annulus 18. This member catches any condensate that drains from the adjacent part of the header 2, thus preventing it from entering the burner, presently to be described. The annulus constitutes the bottom wall of the combustion chamber, proper, within which is housed the circulating unit 1.

The combustion chamber body 15 is provided with diametrically opposed holes through one of which is extended the nipple 7, and through the other, the plug 8. Applied to the nipple and plug, respectively, are nuts 7ª and 8ª, between which and the wall of the combustion chamber body are compressed, about the openings in said wall, packing washers 7ᵇ and 8ᵇ. By this means the circulating unit is rigidly secured to the combustion chamber body, and the holes through which the nipple and plug extend are effectively sealed against the ingress of water.

The portion of the combustion chamber that is occupied by the top part of the circulating unit 1 is enclosed by a cylindrical casing 22 whose lower end extends into the top of the combustion chamber body 15 and is embedded in a gasket 24 of suitable packing material that is sustained by a ring-like retainer 25, suitably fastened to the cylindrical wall of the body 15. The casing 22 includes an annular top wall 27 whose inner edge portion is stepped down to provide a depressed seat upon which bears the peripheral portion of a dome 30. The dome is open at its center for the accommodation of the tubular fitting 10 to which is applied a nut 31 by which the dome, and likewise the casing 22, are depressed so as to effect the embedding of the lower end of the casing in the gasket 24, as previously described. So that the casing 22 may be lifted in order to afford access to the circulating unit 1 without the necessity of disconnecting the conduit F from the apparatus A (Fig. 1), the dome 30 is formed with a radial slot 32 (Fig. 2) that enables the dome to be removed when the nut 31 is relaxed, after which the casing is free to be lifted. It will be noted that the top wall of the upper header 3 of the circulating unit is elevated throughout its center portion and normally extends into the opening of the annular top 27.

Secured to and projecting laterally from the casing 22, in register with an outlet opening 34 thereof, is a flue box or connection 35 formed on its upper side with a neck 36. A band 37 surrounds, and is spot welded or otherwise secured to, the neck 36. Supported above the band 37, at one side by means of a strip 38 that is spot welded to the parts wherewith it contacts, and at the other by a lug 39, is a split clamping ring 40, downwardly through which the lower end of the flue J is extended so as to seat within the band 37 and against the neck 36. Ears extend from the ends of the split clamping ring 40 on opposite sides of the lug 39 and are adapted to be drawn together by a bolt or the like 41 that is extended through registering apertures in the ears and said lug.

Applied to the lower end of the combustion chamber body 15 is a cylindrical body extension 45. The top of said extension is enlarged slightly, and secured to the extension on the inner side thereof adjacent the top is a retainer 46 for a gasket 47 of suitable packing material. The lower end of the combustion chamber body seats upon and is forced into the gasket 47 when the body and extension are drawn together. This is accomplished by means of screws 47 (Figs. 2 and 4) that extend upwardly through holes in lugs 48 on the extension 45 and are threaded into tapped holes in lugs 49 on the body 15. The bottom of the extension 45 is shown as flared slightly, and secured to the inner side of the extension a short distance above its lower end is a ring-like retainer 50 between which and the wall of the extension is confined a gasket 51 of suitable packing material. This gasket arrangement is similar to that associated with the top of the combustion chamber body and its purpose will presently appear.

Within the space below the annulus 18 and surrounded by the lower portion of the combustion chamber body 15 and the extension 45, which space constitutes a burner compartment designated X in Fig. 3, is located a pot type burner 52, the same consisting of a cylindrical bowl to the upper end of which is fitted an annular top wall 53, the central opening of which is surrounded by a depending lip 54 whose diameter is somewhat greater than that of the previously mentioned lip 19. The burner is supported from and in properly spaced relation to the annulus 18 by a plurality of connecting elements 55 which have their reduced upper and lower ends projected through openings in said annulus and the wall 53, respectively, and to which they are suitably secured, as by welding. A space is thus provided between the top wall of the burner bowl and the annulus 18 through which air is admitted to the bowl from the burner compartment X, the air being deflected downwardly into the bowl by the lip 19. The peripheral wall of the burner bowl is provided, about its upper portion, with a plurality of air admitting openings 56, and said wall merges at its lower end into a reentrant frusto conical bottom wall 57. A lighting tube 58 has its upper end fitted within a central opening of the frusto conical wall 57 and is suitably secured, as by welding, to the flanged adjacent edge portion of said wall. The tube extends some distance below the bottom plane of the burner and the same is surrounded in about said plane by a plate 59 that is fastened, by welding or otherwise, to the bottom of the burner bowl or to the tube 58 or to both.

The lower end of the lighting tube 58 is provided with an outwardly extending flange 60, and a closure 61, that is considerably greater in diameter than the flange 60, is sustained in operative relation to the lower end of the lighting tube by a member 62, desirably in the form of a channel, that is connected, by a pivot 63, to a support 64 that is secured to and depends from the plate 59. A loose connection between the closure 61 and the member 62 is provided by a pin 65 which has its upper end riveted or otherwise secured to the closure. The pin passes freely through an aperture in the web of the member 62, and beyond said web is provided with a head 66. A latch 68 is pivoted at 69 to the free end of the member 62, and engaging a part thereof is a rocker element 70 that is confined against lateral displacement by the side flanges of the member 62 and bears at its end remote from the latch on the web of said member. The rocker element is apertured for the passage of the pin 65, and surrounding said pin is a helical spring 72 that is compressed between the rocker element and the closure 61 and serves the twofold purpose of urging the closure 61 toward the flanged end of the lighting tube 58, and of rocking the element 70 in a direction to swing the latch 68 to effective position with its nose 73 bearing against the upper side of the lighting tube flange 60. The closure 61 is provided with a notch 74 for the accommodation of the support 64, and with a slot 75 for the passage of the latch member 68.

Pivotally mounted on the closure 61, as will appear from Figs. 5 and 6, is an adjustable shim 80 that is thicker at one end than at the other, and the same is adapted to be adjusted to three different positions, as indicated by the indicia inscribed upon the closure 61. In the first of said positions the shim is beyond the reach of the flange 60, and allows the spring 72 to press the closure 61 against the under face of said flange. This prevents the admission of air to the burner bowl through the lighting tube 58, and accordingly limits the rate of fuel consumption to the minimum, so far as the air factor is concerned. When the shim is turned to second position, its thinner end is interposed between the closure and the said flange 60, thereby allowing a limited amount of air to enter through the lighting tube and effecting a proportional increase in fuel consumption. When the shim is turned to third position, its thicker end is so disposed as to space the closure a greater distance from the flange 60, thereby permitting a larger amount of air to be admitted to the burner bowl through the lighting tube 58, which results in a further acceleration of fuel consumption.

To prevent chilling of the lower portion of the burner bowl by cold air entering the compartment X through the open bottom of the extension 45, such as would unduly retard vaporization of the fuel in the sump of the bowl, a shell 84 is applied to the lower end of the burner bowl and is sustained in spaced relation thereto by a suitable number of L-shaped brackets that are carried by and extend inwardly from the extension 45, one of which is shown at 85 in Fig. 3.

Liquid fuel is supplied to the burner bowl through a tubular connection 88 that extends through and is sealed within an opening of the extension 45 and leads from a fuel feed chamber 89 that is enclosed by a cylindrical casing 90. This casing houses the adjustable fuel feed, later to be described in detail and, in turn, is supplied with fuel from a float chamber 95 to which it is communicatively connected by an element 96 (Fig. 7) having a fuel port 97 and a vent port 98. The float chamber and float controlled valve mechanism may be of any approved type, that shown including a fuel inlet fitting 100 that is mounted on the top wall 101 of the float chamber and the feed orifice 102 of which is controlled by a needlepoint valve 103. The float 105 is carried by an arm 106 that is pivotally supported at 107 from a convenient part of the float chamber. A helical spring 108 is interposed between the float arm 106 and the valve 103 and through the intervention of the same the valve is seated when the float is lifted by an accumulation of fuel within the chamber 95 to the elevation shown in Fig. 7. A connection 109 is swiveled, with a leak-proof joint, to the fitting 100 for rotary adjustment with respect thereto. The previously mentioned fuel pipe I leads from the source of fuel to the connection 109 and is desirably equipped, adjacent said connection, with a valve i. The fuel feed referred to, except for certain details peculiar to its present adaptation, is the invention of Lee S. Chadwick, and constitutes the subject matter of his copending application Serial No. 479,042 filed concurrently herewith, said application and the present one being assigned to a common assignee. Among said certain details for which I am responsible is one having to do with the shutting off of the fuel feed when the bottom portion of the apparatus is closed at times when the apparatus is not in use.

Referring particularly to Figs. 7 and 8, the bottom 110 of the casing 90 is shown as provided with a depending skirt 111 that is surrounded on its interior, near its open end, by a gasket 112 that is held in place by a retainer 113. A top 115 telescopes over the upper end of the casing 90 and carries a gasket 116 that is compressed against the top edge of the casing when the cover is drawn down by clamping means including a cross bar 118 that is attached, as by a rivet 119, to the cover, and is provided with apertures at its ends through which clamping screws 120 are projected downwardly for threaded engagement with lugs 121 that extend from the sides of the casing 90.

A partition 125 is disposed diametrically across the casing and rises from the bottom wall 110 thereof to an elevation a considerable distance above the liquid level established by the float control valve 103 in the float chamber and in the adjacent receiving compartment 126 of the fuel feed chamber 89. On the opposite side of said partition is a delivery compartment 127 that communicates, through the previously mentioned tubular connection 88, with the burner. Supported by a carrier 130 astride the partition 125 is an inverted U-shaped wick 131 which, by reason of its function, may be termed a wick or capillary siphon. Incorporated in and extending laterally from the upper end of the carrier 130 is an arm 132 that is swiveled to the top end of a wick adjusting screw 133 that carries a nut assembly 134 with respect to which the screw may be fed up or down by turning the screw in one direction or the other. The screw 133 extends through an aperture in the bottom wall 110 and has a cylinder 135 fastened to its lower end. This cylinder bears indicia 136 which, when read in conjunction with the bottom edge of the skirt 111 as an index, indicates the rate at which oil is fed by the wick 131 according to the latter's adjustment. A spring 137 surrounds the screw 133 and is interposed between a bearing at the lower end of the sleeve 135 and an abutment adjacent the bottom wall 110 and serves to depress the screw so as to lower the wick a distance permitted by the engagement of the nut assembly 134 with the top of a sleeve 139 that is sealed to the bottom wall 110 about the beforementioned aperture and surrounds the screw for a suitable distance above said wall. The nut assembly 134 incorporates a bifurcated lateral extension 140 that cooperates with a guide 141 on the side of the casing 90 in such manner as to prevent the nut assembly from turning. It will be seen from the construction just described that the wick 131 may be adjusted vertically of the partition 125 by turning the screw 133 so as to feed the screw up or down through the nut assembly. It is also evident that the wick may be instantly elevated by simply lifting the screw against the tension of the spring 137, the nut assembly rising with the screw along the guide 141. The feed chamber 89 is vented through a tube 145 that has its lower end secured within an aperature of the wall 110 and rises a suitable distance within the outlet compartment 127 alongside the sleeve 139.

As shown particularly in Fig. 2, a bracket mounting plate 147 is secured, as by welding, to one side of the combustion chamber body 15 above the plane of the lugs 49 (Fig. 4); and, as indicated by full and dotted lines in Fig. 2, the same is capable of occupying any one of three positions that are 90° apart. The adjustment is made by removing the screws 47, turning the body to dispose its lugs 49 in different relation to the lugs 48 of the extension 45, and replacing the screws, it being remembered that said extension is immovable with respect to the casing 90 of the liquid fuel feed by reason of its attachment thereto through the connection 88, and, additionally, through ties 149. By reason of this adjustability of body and consequently of the bracket mounting plate, the bracket B may be so arranged with respect to the apparatus A that the latter may be disposed on either side of the engine and connected either to the engine or to the vehicle frame, or to some other part of the vehicle; and to further facilitate installation and adapt the apparatus to many different conditions, the casing 22 may be orientated with respect to the body to dispose the flue box 35 at any desired angle to the vertical axis of the heater. It will be remembered, also, that the connection 109 to which the fuel pipe I is attached is capable of being adjusted about the vertical axis of the fitting 100, permitting the fuel pipe to approach the apparatus from any one of many directions. It should also be explained in this connection that the nipple 7 and plug 8 are interchangeable so that the inlet conduit E may extend from either side of the combustion chamber body 15.

Connected to and depending from the side of the body extension 45, diametrically opposite the casing 90 of the fuel feed, is a bracket 150 to which is hingedly connected, through a pivot 151, an inverted channel bar 152. Loosely connected to the bar 152 are two circular closures 153 and 154. The closure 153 has a peripheral flange of a size to fit upwardly within the body extension 45 so that said flange may contact the gasket 51, while the closure 154 has a similar flange of a size to enter the flared lower end of the skirt 111 on the bottom of the casing 90 and contact the previously mentioned gasket 112. The loose connection between the bar 152 and the respective closures 153 and 154 is effected through studs 155 and 156 that are riveted to the closures and extend through apertures in the web of the bar 152, beyond which said studs are provided with heads. Springs 158 and 159 surround the respective studs 155 and 156 and are compressed between the web of the bar 152 and the closures. To insure proper action of the closure 153 by preventing too free a movement thereof with respect to the bar 152, said closure is provided with a second or guide stud 160 that also extends through an aperture in the web of the bar 152 and is provided therebeyond with a head; and surrounding said stud, and compressed between the closure and the web of the bar is a spring 162. When the bar 152 is in the position shown in Fig. 3, its free end projects somewhat beyond the left hand side of the fuel feed casing 90, as the parts are viewed in said figure, and pivotally suspended from said casing in vertical alignment with said end of the bar is a link 165. According to the present construction, this link is relatively thin and flat, and near its upper end is disposed between ears 166 that are secured to and extend laterally from the casing 90 and support a pin 167 on which the link is pivoted, the link being confined against sidewise movement by a bifurcated guide 168 that is fastened to and projects from the side of the casing 90. Connected by a pivot 170 to the lower end of the link 165, where the link curves about and beneath the end of the bar 152, is a latch member 171, having a nose 172 that is adapted to be projected through a slot in the web of the bar so that a cross pin 173 on the latch member may engage the under side of said web on opposite sides of the slot. The latch member is formed with a finger-like handle 175, and when the parts are in the position shown in Fig. 3, the springs 158, 159 and 162 are under compression, thereby serving to urge the closures 153 and 154 against the gaskets 51 and 112, respectively, and to retain the latch member in position with its handle up against the bar by reason of the downward pressure imposed upon the pin 173.

When the closure 154 is in closing position, which may be at any time the heating apparatus is not in operation, as when the vehicle is in use, the feeding of fuel is suspended. This result is brought about by said closure 154 engaging and lifting the screw 133 and with it, through the arm 132 and carrier 130, the wick 131 above feeding position.

To condition the apparatus for use, the handle 175 of the latch member 171 is grasped and swung downwardly from the position shown in Fig. 3 through sufficient of an arc to withdraw its nose 172 from the slot in the bar 152 and remove the hooked lower end of the link 165 from the path of the free end of said bar. Thereupon the bar drops to approximately the position shown in Fig. 9, carrying with it the closures 153 and 154. With the valve $i$ open, liquid fuel fills the float chamber and the compartment 126 to the level indicated in Fig. 7.

When the cover 154 drops away from the bottom of the casing 90, it permits the spring 137 to depress the screw 133 and lower the wick 131 a distance determined by engagement of the nut assembly 134 with the stop of the sleeve 139. The extent to which the receiving leg of the U-shaped wick dips into the fuel in the compartment 126 is governed by the adjustment of the screw 133 with respect to the nut assembly. This condition determines, also, the rate of flow of the fuel from the receiving compartment 126 to the delivery compartment 127 through the capillary and siphonic action of the wick.

From the delivery compartment 127, the fuel flows through the tubular connection 88 to the annular trough-like sump constituted of the bottom wall and adjacent portion of the side wall of the burner bowl 52. The fuel level in the burner bowl will at no time exceed that in the delivery compartment 127, and when the burner is in operation, will be less. In the absence of combustion, the fuel level in these parts may reach that prevailing in the float chamber and receiving compartment 126, through the capillary and siphonic action of the wick. While the apparatus is in operation, however, the fuel will be consumed at such a rate that only a small quantity will be present in the burner bowl, and only a little more in the delivery compartment 127.

Preparatory to lighting the burner, the latch member 68 is swung against the action of the spring 72 (which action is transmitted to the latch member through the rocker element 70) to withdraw the nose 73 from the flange 60 whereupon the bar 62 swings down to the position shown in Fig. 9 and carries with it the closure 61. To light the burner, the igniter or torch designated N in Fig. 9 is employed. It consists of a metal strip 180 to the upper end of which is connected, as by welding, a metal clip 181 within which is clamped a wick 182 of suitable material, such as asbestos webbing. In the use of the igniter it is projected up through the lighting tube 58 so that the wick may be dipped into the fuel in the sump of the burner bowl, and when the wick is saturated the igniter is removed and lighted by a match or other means and returned to its former position within the bowl to light the fuel. The igniter is then withdrawn, extinguished and laid aside, after which the bar 62 is swung upwardly to return the closure 61 to effective position. The parts are held in this condition by engagement of the latch member 68 with the flange 60.

Two adjustments are made in adapting the apparatus to the particular size engine to be heated. One has to do with the rate of fuel feed, and consists in the adjustment of the screw 133 with respect to the nut assembly 134, and the other has to do with the rate of fuel consumption, and consists in the adjustment of the closure 61 with respect to the flanged lower end of the lighting tube 58. This adjustment, as previously described, is effected through the shim member 80 that is pivoted to the top side of the closure. The rate of fuel consumption, and consequently the size of the fire, is determined by the amount of air supplied to the burner, and if the shim member 80 is turned to ineffective first position, marked "1" in Fig. 5, the cover bears against the flange 60 and shuts off the supply of air through the lighting tube, thus effecting the lowest rate of fuel consumption and the smallest fire. Increase in said rate and consequent larger fires are effected by turning the member 80 to second and third positions, marked "2" and "3", respectively, under the first of which circumstances the thinner end of the member is interposed between the cover and tube, and under the second of which the thicker end occupies such position.

As the fuel within the sump of the burner bowl is vaporized by heat conducted thereto through the metal parts of the bowl, and/or radiated directly thereto, from the heated burner parts and flame above, the vapors rise and commingle with primary air entering through the openings 56 in the peripheral wall of the bowl, and as the resultant combustible mixture rises and enters the zone of secondary air entering through the slot between the lips 19 and 54, it burns vigorously and ascends through the opening surrounded by the lip 19 and the ring-like member 20 thereabove into the combustion chamber proper, where the products are deflected outwardly by the baffle 12 and sweep up about the tubes 4 and beneath the upper header 3 before escaping through the flue box 35 and flue J to the atmosphere.

To shut down the apparatus it is only necessary to swing the bar 152 upwardly and secure it in elevated position by the latch member 171 in the manner already described, under which circumstances the closures 153 and 154 are pressed up into the bottoms of the heater and fuel feed casing to seal both. This deprives the burner of air which causes the fire to go out and, at the same time, by means of the closure 154, the screw 133 is elevated to withdraw the wick from the oil supply or dispose it above feeding range. If desired, the valve i may be closed to positively prevent delivery of oil to the float chamber which might occur in excess by the float being vibrated and the valve intermittently opened when the vehicle is in motion. With the apparatus thus closed at the bottom against the ingress of water, and sealed effectively to near the top according to the present embodiment, the vehicle may be driven through water to a depth that would nearly submerge the apparatus without having any detrimental effect thereon. Obviously, by inserting a gasket between the inturned upper end of the casing 22 and the upper header 3 of the circulating unit, and making said casing and the flue box, etc. water tight, the whole apparatus could be submerged without water gaining access to its interior.

Having thus described my invention, what I claim is:

1. In heating apparatus for internal combustion engines of automotive vehicles adapted for installation on the vehicle in proximity to the engine, the combination of a liquid fuel burner, a casing housing the same, said casing being open at the bottom and otherwise water-tight below a level above the burner, a member movably connected to the apparatus, a closure carried thereby, and means for sustaining the member in a position to apply said closure to the open bottom of the casing.

2. In heating apparatus for internal combustion engines of automotive vehicles adapted for installation on the vehicle in proximity to the engine, the combination of a liquid fuel burner, a casing housing the same, said casing being open at the bottom and otherwise water-tight below a level above the burner, a member movably connected to the apparatus, a closure yieldingly carried thereby, a latch for sustaining the member in a position to apply the closure to the open bottom of the casing, and a spring that is active when the member is in said position for urging the closure to closing position and for retaining the latch in effective latching position.

3. In heating apparatus for internal combustion engines of automotive vehicles adapted for installation on the vehicle in proximity to the engine, the combination of a liquid fuel burner, a casing housing the same, said casing being open at the bottom and otherwise water tight below a level above the burner, a member pivotally connected to the casing at one side thereof, a latch for holding said member in opposed spaced relation to the open bottom of the casing, a closure for application to said open bottom, means extending from the closure and cooperating with said member to movably attach the closure to the member and guide it in its movements with respect thereto, and a spring interposed between said member and closure urging the closure to closing position.

4. In heating apparatus for internal combustion engines of automotive vehicles adapted for installation on the vehicle in proximity to the engine, the combination of a liquid fuel burner, a casing housing the same, said casing being open at the bottom and otherwise water tight below a level above the burner, a second casing adjacent the first mentioned casing that is provided with an opening at the bottom and is otherwise water tight, liquid fuel feeding means within the second casing, regulating means therefor accessible through the opening in the second casing, communicative connections between the second casing and the burner, an elongated member, means pivotally connecting the same at one of its ends to one of the casings adjacent a side thereof remote from the other casing, a latch on said other casing for cooperation with the free end of said member thereby to sustain the member in a position beneath the casings in opposed relation to the bottoms thereof, closures for the open bottom of the first casing and for the opening of the second casing, respectively, means loosely connecting said closures to said member, and springs interposed between the closures and said member for urging the closures to closing position.

5. In heating apparatus for internal combustion engines of automotive vehicles adapted for installation on a vehicle in proximity to the engine, the combination of a liquid fuel burner, a casing housing the same, said casing being open at the bottom and otherwise water tight below a level above the burner, means for supplying fuel to the burner, a shut-off device for said fuel supply means, and closure means for sealing the open bottom of said casing at times when the burner is not in use, said closure means, when in closing position, cooperating with said shut-off device to render the fuel supply means ineffective.

6. Heating apparatus for internal combustion engines comprising a liquid fuel burner, means for feeding fuel thereto, a control element for rendering said fuel feeding means ineffective, enclosure means housing the burner and the fuel feeding means, said enclosure means being open at the bottom to afford access to said control element and to permit lighting of and the admission of air to the burner, and closure means for closing the open bottom of the enclosure means and which, when moved to closing position, acts through said control element to render the fuel feeding means ineffective.

7. Heating apparatus for internal combustion engines comprising a liquid fuel burner, fuel feeding means therefor, a control element depending from said fuel feeding means, enclosure means housing the burner and the fuel feeding means, said enclosure means being open at the bottom to afford access to said control element and to permit lighting of and the admission of air to the burner, and closure means movably supported in operative relation to the enclosure means for closing the open bottom thereof and which, when moved to closing position, engages and operates said control element to throw the fuel feeding means out of operation.

8. In heating apparatus for internal combustion engines of automotive vehicles adapted for installation on the vehicle in proximity to the engine, the combination of a liquid fuel burner comprising a burner bowl incorporating a fuel sump and characterized by an opening in its bottom adjacent said sump through which lighting means is adapted to be projected for igniting the fuel in the sump, means for supplying liquid fuel to the bowl, a casing housing the burner, said casing being open at the bottom and otherwise water-tight below a level above the burner, and a closure for sealing the open bottom of said casing at times when the burner is not in use.

9. In heating apparatus for internal combustion engines of automotive vehicles adapted for installation on the vehicle in proximity to the engine, the combination of a liquid fuel burner comprising a burner bowl having a fuel sump in the bottom thereof and characterized by an opening in said bottom adjacent said sump and above the maximum fuel level therein through which opening lighting means is adapted to be projected and air is admitted to the bowl, means for varying the amount of air admitted through said opening, means for supplying liquid fuel to the bowl, a casing housing said burner, said casing being open at the bottom and otherwise water-tight below a level above the burner, and a closure for sealing the open bottom of said casing when the burner is not in use.

10. In heating apparatus for internal combustion engines of automotive vehicles adapted for installation on the vehicle in proximity to the engine, the combination of a liquid fuel burner comprising a burner bowl having an opening in its bottom wall, a lighting tube in said opening through which igniting means is adapted to be projected, the upper end of the tube being above the maximum fuel level in the bowl, means for varying the amount of air admitted to the bowl through the lighting tube, means for supplying liquid fuel to the bowl, a casing housing the burner, said casing being open at the bottom and otherwise water-tight below a level above the burner, and a closure for sealing the open bottom of said casing when the burner is not in use.

11. In heating apparatus for internal combustion engines of automotive vehicles adapted for installation on the vehicle in proximity to the engine, the combination of a liquid fuel burner comprising a bowl having a fuel sump in the bottom thereof and characterized by a lighting opening in said bottom adjacent the sump and above the maximum fuel level therein and through which opening igniting means is adapted to be projected, closure means for said opening, means for supplying liquid fuel to the bowl, a casing housing the burner, said casing being open at the bottom and otherwise water-tight below a level above the burner, and a closure for sealing the open bottom of said casing at times when the burner is not in use.

12. In heating apparatus for internal combustion engines of automotive vehicles adapted for installation on the vehicle in proximity to the engine, the combination of a liquid fuel burner comprising a bowl having an opening in its bottom wall, a tube in said opening through which igniting means is adapted to be projected, the upper end of the tube being above the maximum fuel level in the bowl, closure means for said tube, means for supplying liquid fuel to the bowl, a casing housing the burner, said casing being open at the bottom and otherwise water-tight below a level above the burner, and a closure for sealing the open bottom of said casing at times when the burner is not in use.

13. In heating apparatus for internal combustion engines of automotive vehicles adapted for installation on the vehicle in proximity to the engine, the combination of a liquid fuel burner comprising a bowl having an annular bottom wall formed with a reentrant portion substantially central of the bowl thereby to provide a sump surrounding a central opening in said wall, a tube disposed within said opening and through which igniting means is adapted to be projected, closure means for said tube, means for supplying liquid fuel to the bowl, a casing housing the burner, said casing being open at the bottom and otherwise water-tight below a level above the burner, and a closure for sealing the open bottom of said casing at times when the burner is not in use.

14. In heating apparatus for internal combustion engines of automotive vehicles adapted for installation on the vehicle in proximity to the engine, the combination of a liquid fuel burner, means supplying liquid fuel to the burner according to the rate of consumption, a casing housing the burner, said casing being open at the bottom for the admission of combustion air to the burner and otherwise water-tight below a level above the burner, a closure for sealing the open bottom of said casing against the ingress of water at times when the burner is not in use, and means movably connecting said closure to the apparatus so that without disconnection therefrom the closure may be shifted between open and closed position and whereby the closure is sustained in open position when the burner is in use.

MARC RESEK.